United States Patent
Sugino (10) Patent No.: US 10,792,961 B2
(45) Date of Patent: Oct. 6, 2020

(54) TIRE STATE MONITORING DEVICE

(71) Applicant: PACIFIC INDUSTRIAL CO., LTD., Ogaki-shi, Gifu-ken (JP)

(72) Inventor: Takumi Sugino, Ogaki (JP)

(73) Assignee: PACIFIC INDUSTRIAL CO., LTD., Ogaki-shi (JP)

( * ) Notice: Subject to any disclaimer, the term of this patent is extended or adjusted under 35 U.S.C. 154(b) by 315 days.

(21) Appl. No.: 15/761,580

(22) PCT Filed: Jun. 23, 2016

(86) PCT No.: PCT/JP2016/068649
§ 371 (c)(1),
(2) Date: Mar. 20, 2018

(87) PCT Pub. No.: WO2017/221371
PCT Pub. Date: Dec. 28, 2017

(65) Prior Publication Data
US 2018/0339561 A1    Nov. 29, 2018

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC .... B60C 23/0494; B60C 29/02; B60C 29/005
See application file for complete search history.

(56) References Cited

U.S. PATENT DOCUMENTS

| 7,257,998 B2 | 8/2007 | Luce |
| 7,568,386 B2 * | 8/2009 | Blossfeld ............ B60C 23/0408 73/146.8 |
| 7,810,390 B2 | 10/2010 | Hettle et al. |

(Continued)

FOREIGN PATENT DOCUMENTS

| CN | 2651021 Y | 10/2004 |
| CN | 1762728 A | 4/2006 |

(Continued)

OTHER PUBLICATIONS

Oct. 8, 2018 Extended Search Report issued in European Patent Application No. 16906288.2.

(Continued)

*Primary Examiner* — Kip T Kotter
(74) *Attorney, Agent, or Firm* — Oliff PLC (57) ABSTRACT

A tire state monitoring device that is able to stabilize fixing of a sensor unit is provided. A tire state monitoring device includes a tire valve mounted on a tire wheel, a cylindrical nut screwed onto the valve stem of the tire valve, and a sensor unit that detects a tire state and transmits a detection result to an external part. A nut insertion hole, into which the cylindrical nut is inserted, is formed in the sensor unit. An elastic ring member is fitted on the outer peripheral surface of the cylindrical nut and elastically deforms in the radial direction of the cylindrical nut while the cylindrical nut is kept inserted in the nut insertion hole. The sensor unit is held by the cylindrical nut by a resilient force of the elastic ring member.

4 Claims, 6 Drawing Sheets

(56) References Cited

U.S. PATENT DOCUMENTS

| | | | | |
|---|---|---|---|---|
| 8,291,755 | B2 * | 10/2012 | Fukui | B60C 23/006 73/146 |
| 2004/0263324 | A1 | 12/2004 | Sanchez et al. | |
| 2006/0075812 | A1 | 4/2006 | Luce | |
| 2008/0202659 | A1 | 8/2008 | Hettle et al. | |
| 2010/0095756 | A1 | 4/2010 | Fukui et al. | |
| 2010/0192682 | A1 | 8/2010 | Gory et al. | |
| 2011/0315235 | A1 | 12/2011 | Colefax et al. | |
| 2017/0267037 | A1 * | 9/2017 | Li | B60C 23/0498 |

FOREIGN PATENT DOCUMENTS

| | | | | |
|---|---|---|---|---|
| CN | 101687448 | | 3/2010 | |
| CN | 102187132 | A | 9/2011 | |
| CN | 104284787 | A | 1/2015 | |
| CN | 205009895 | U | 2/2016 | |
| EP | 0265296 | A1 | 4/1988 | |
| EP | 1510371 | A1 * | 3/2005 | B60C 23/0408 |
| EP | 1 647 422 | A1 | 4/2006 | |
| JP | 2002-264621 | A | 9/2002 | |
| JP | 2006-111262 | A | 4/2006 | |
| JP | 2010-519130 | A | 6/2010 | |
| WO | 2004074013 | A2 | 9/2004 | |

OTHER PUBLICATIONS

Aug. 23, 2016 Written Opinion issued in International Patent Application No. PCT/JP2016/068649.

Aug. 23, 2016 International Search Report issued in International Patent Application No. PCT/JP2016/068649.

May 8, 2019 Office Action issued in Chinese Patent Application No. 201680054392.7.

Sep. 5, 2019 Office Action issued in Taiwanese Patent Application No. 105126212.

Feb. 7, 2020 Office Action issued in Taiwanese Patent Application No. 105126212.

* cited by examiner

TIRE STATE MONITORING DEVICE

TECHNICAL FIELD

The present disclosure relates to a tire state monitoring device formed integrally with a tire valve.

BACKGROUND ART

Conventionally, as a tire state monitoring device of this type, a tire state monitoring device has been known in which a sensor unit including a pressure sensor and a temperature sensor is fixed to the valve stem of the tire valve (refer to, for example, Patent Literature 1). Specifically, in this tire state monitoring device, the sensor unit is fixed to the valve stem by screwing a nut onto the valve stem while the valve stem penetrates through a through-hole formed in the sensor unit.

RELATED ART DOCUMENTS

Patent Documents

Patent Document 1: Japanese Unexamined Patent Application Publication No. JP 2002-264621 A (line 24 in the left column on page 3 to line 9 in the right column on the same page, FIG. 1).

SUMMARY OF THE INVENTION

Problems to be Solved by the Invention

However, the conventional tire state monitoring device described above has a problem in that, for example, if a tire hits the sensor unit and the sensor unit rotates about the valve stem when the tire is mounted on a tire wheel, the nut is rotated together with the sensor unit and is loosened, resulting in unstable fixing of the sensor unit.

An object of the present disclosure is to provide a tire state monitoring device that stabilizes fixing of a sensor unit.

Means for Solving the Problems

A tire state monitoring device of the present disclosure is formed integrally with a tire valve mounted on a tire wheel. The tire state monitoring device includes a valve stem provided in the tire valve and penetrating through the tire wheel, a male screw part formed on an outer peripheral surface of a portion of the valve stem that is located in a tire, a cylindrical nut screwed onto the male screw part of the valve stem, a sensor unit configured to detect a tire state and configured to transmit a detection result to an external part, a nut insertion hole formed in the sensor unit and through which the cylindrical nut is inserted, and an elastic ring member fitted on an outer peripheral surface of the cylindrical nut and configured to elastically deform in a radial direction of the cylindrical nut while the cylindrical nut is kept inserted through the nut insertion hole. The sensor unit is held by the cylindrical nut by a resilient force of the elastic ring member.

MODE FOR CARRYING OUT THE INVENTION

Figure 1:
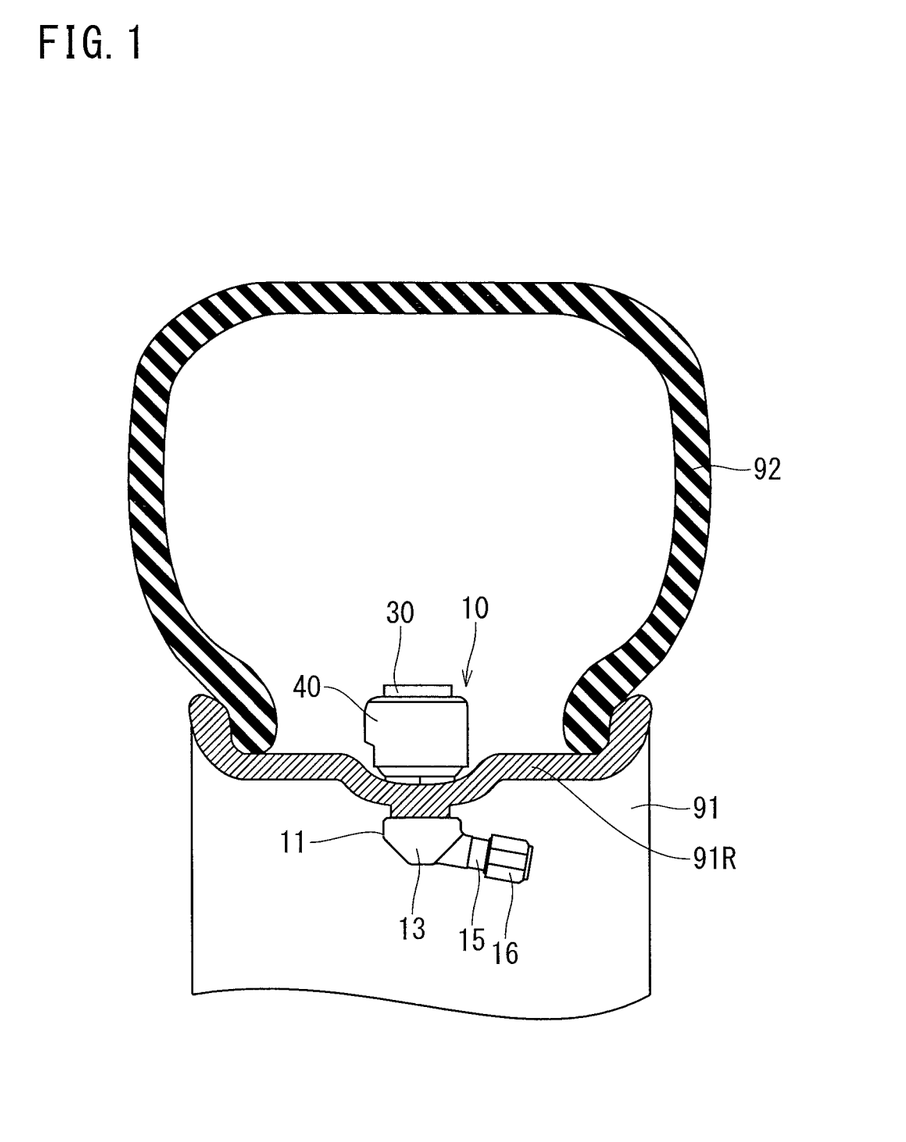
FIG. 1 is a cross-sectional view showing an aspect of a tire state monitoring device being mounted.

As shown in FIG. 1, a tire state monitoring device 10 in the present embodiment is formed integrally with a tire valve 11 and mounted on a tire wheel 91. Specifically, in the tire state monitoring device 10, a sensor unit 40 including, for example, a pressure sensor 41 that detects pressure in the tire 92, is fixed to a valve stem 13 of the tire valve 11.

Figure 2:
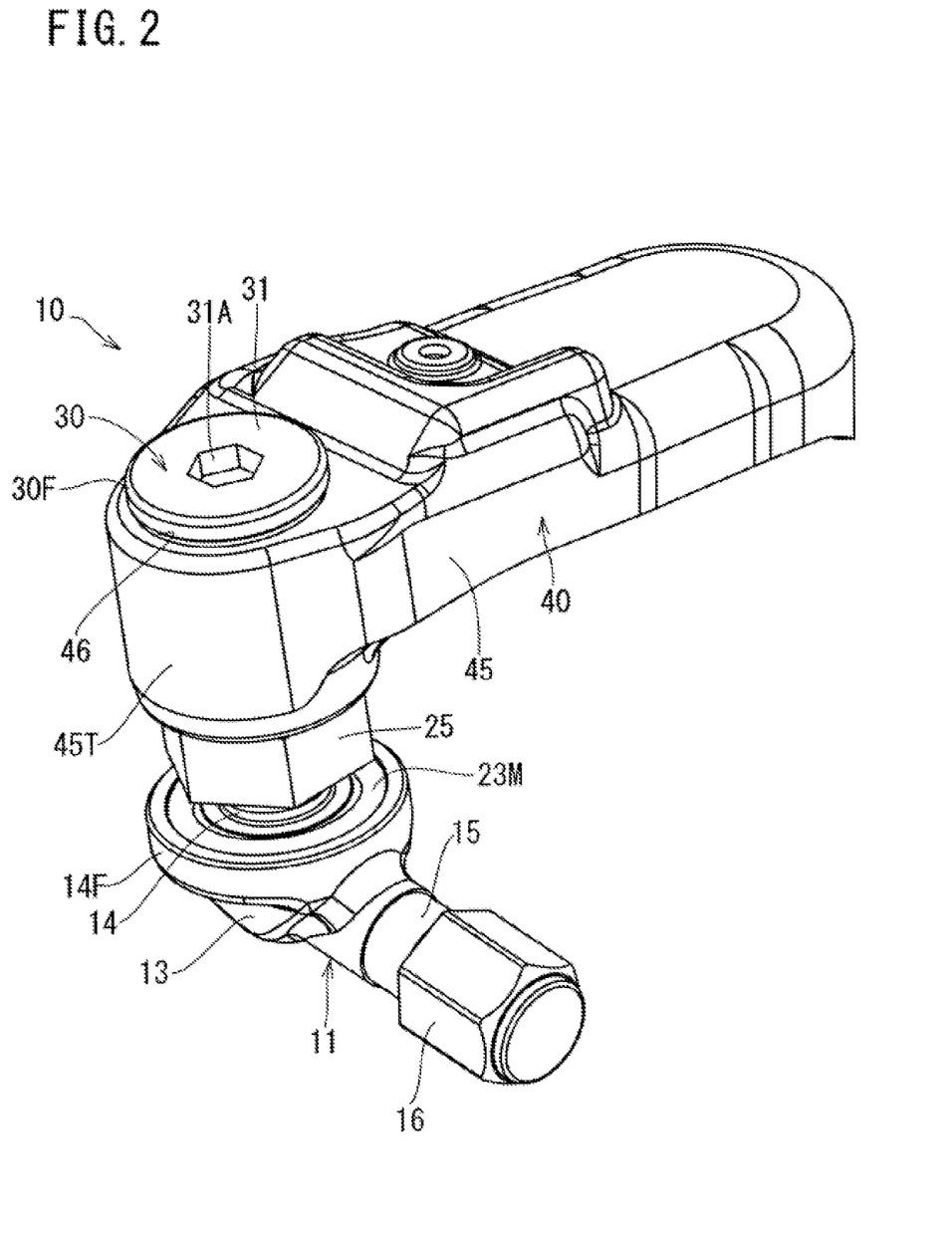
FIG. 2 is a perspective view of the tire state monitoring device.
Figure 3:
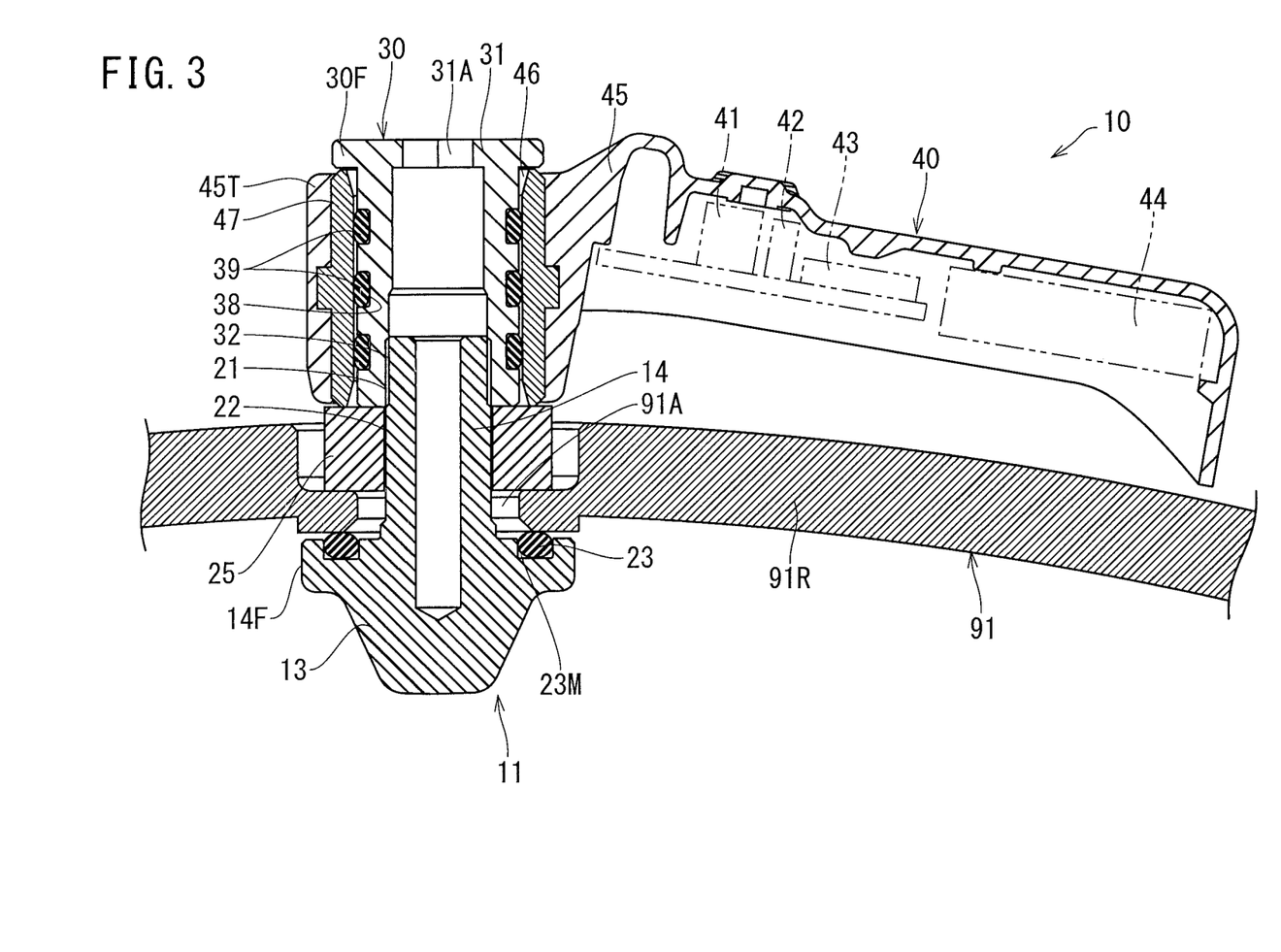
FIG. 3 is a sectional side view of the tire state monitoring device.

As shown in FIGS. 2, 3, the valve stem 13 of the tire valve 11 penetrates through the tire wheel 91 and allows communication between the inside and outside of the tire 92. In the present embodiment, the valve stem 13 is approximately in the shape of a letter L. One side of the letter L of the valve stem 13 serves as a mount shaft part 14, which is mounted in a mounting hole 91A of a wheel rim 91R. The other side of the letter L of the valve stem 13 serves as a connection shaft part 15, which is connected to an air supply device (not shown). The connection shaft part 15 incorporates a valve core (not shown), and the leading end of the connection shaft part 15 is closed by a cap 16.

The mount shaft part 14 includes a flange part 14F at its basal end part located near the connection shaft part 15. An annular groove 23M is formed on a face, facing the leading-end side of the mount shaft part 14, in the flange part 14F. An annular sealing member 23 is received in the annular groove 23M (the annular sealing member 23 is shown in FIG. 3 but is not shown in FIG. 2). The annular sealing member 23 includes, for example, an O-ring, packing, gasket, and the like.

Figure 4:
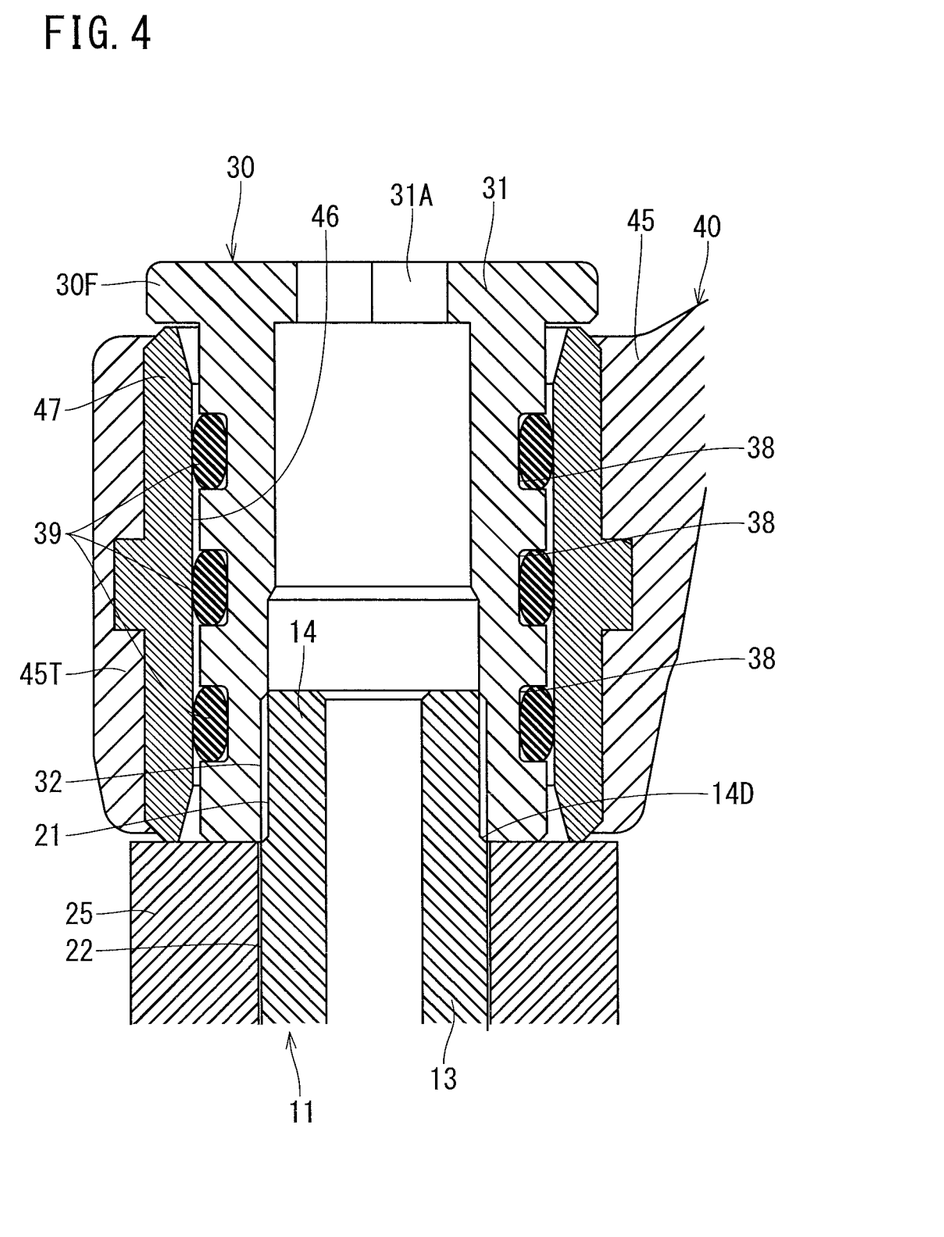
FIG. 4 is an enlarged view of a periphery of a cylindrical nut in FIG. 3.

A male screw part is formed on the outer peripheral surface of a leading-end-side portion of the mount shaft part 14. Specifically, as shown in FIG. 4, the outer peripheral surface of the leading-end-side portion of the mount shaft part 14 has a step part 14D stepwisely decreasing in diameter toward the leading end. A first male screw part 21 is formed in a small-diameter portion on the leading-end side from the step part 14D, and a second male screw part 22 is formed in a large-diameter portion on the basal-end side from the step part 14D.

As shown in FIG. 3, a cylindrical nut 30 is screwed onto the first male screw part 21. A hexagonal nut 25 is screwed onto the second male screw part 22. As presumed from the fact that the second male screw part 22 is larger in diameter than the first male screw part 21, the inside diameter of the hexagonal nut 25 is larger than that of the first male screw part 21. Thus, the first male screw part 21 is prevented from interfering with the hexagonal nut 25 when the mount shaft part 14 is inserted into the hexagonal nut 25 and then the hexagonal nut 25 and the second male screw part 22 are screwed to each other.

The cylindrical nut 30 is structured such that one axial end is closed by an end wall 31 and the other axial end has a female screw part 32 that is screwed onto the first male screw part 21. A hexagonal hole 31A that engages with a hexagonal wrench (not shown) is formed through the end wall 31 (refer to FIG. 2). The one end of the cylindrical nut 30 has a flange part 30F projecting radially outwards.

Figure 5:
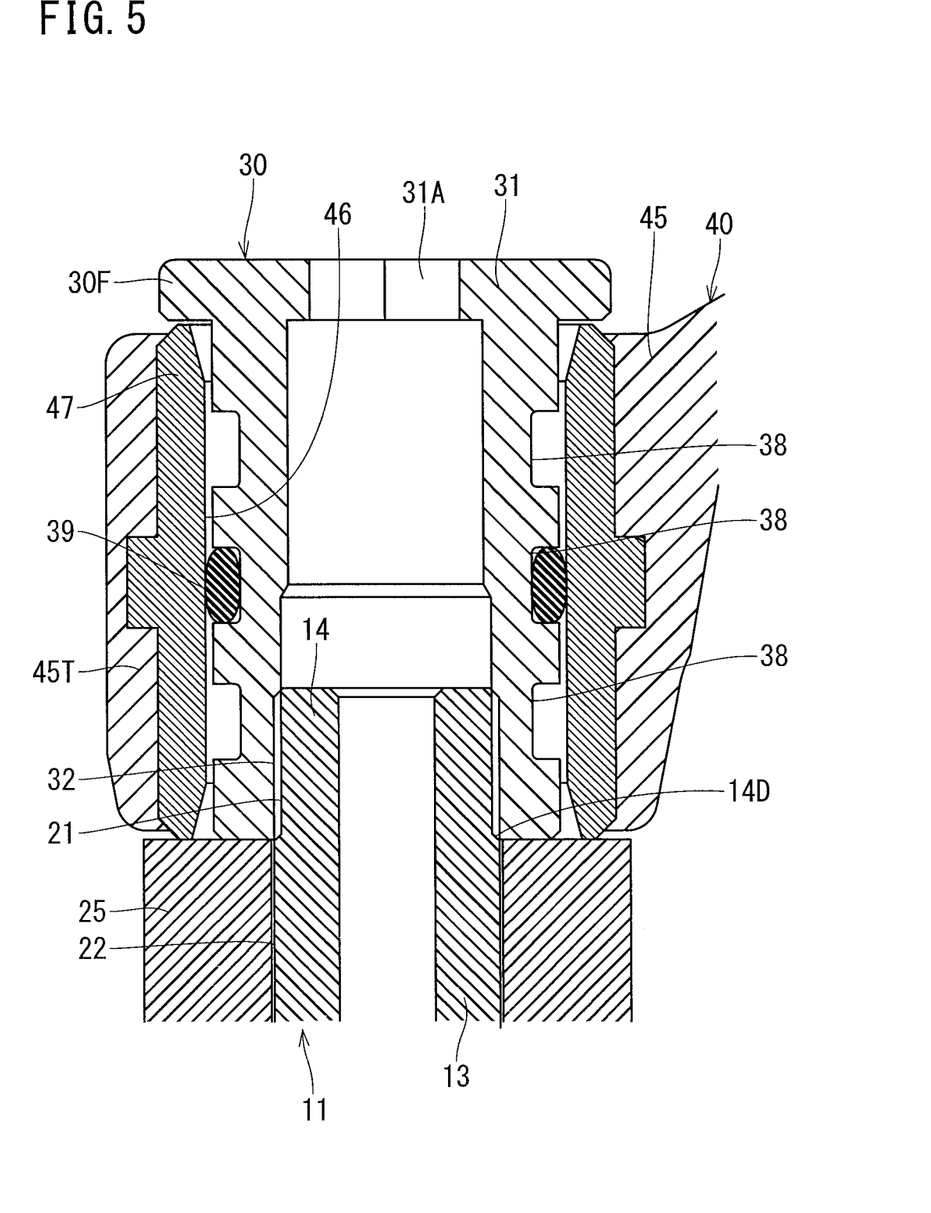
FIG. 5 is a sectional side view of a cylindrical nut to which only one elastic ring member is fitted.

An elastic ring member 39 is mounted on the outer peripheral surface of the cylindrical nut 30. Specifically, the cylindrical nut 30 has a plurality of annular grooves 38 on the outer peripheral surface of a portion located on the other axial end side from the flange part 30F. Elastic ring members 39 are mounted in some or all of the plurality of annular grooves 38. In the present embodiment, three annular grooves 38 are provided. In the example shown in FIGS. 3, 4, the elastic ring members 39 are mounted in all of the three annular grooves 38. In the example shown in FIG. 5, the elastic ring member 39 is mounted in only one annular groove 38. In the present embodiment, each elastic ring member 39 includes an O-ring.

As shown in FIG. 3, the sensor unit 40 is structured such that a pressure sensor 41, a temperature sensor 42, a transmitter 43, a battery 44, etc., are housed in a case 45. The pressure sensor 41 detects pressure in the tire 92. The temperature sensor 42 detects temperature in the tire 92. The transmitter 43 transmits the detection results obtained by the pressure sensor 41 and temperature sensor 42 to an external part. The battery 44 supplies power to the pressure sensor 41, temperature sensor 42, and transmitter 43.

The sensor unit 40 is provided with a nut insertion hole 46 in which the cylindrical nut 30 is inserted. Specifically, a cylindrical part 45T is formed in the case 45 of the sensor unit 40, and the nut insertion hole 46 is defined by the inside portion of a circular collar 47 mounted in the cylindrical part 45T. Here, in the present embodiment, the length of the nut insertion hole 46 is less than the length of the portion, located on the leading-end side from the flange part 30F, of the cylindrical nut 30. The inside diameter of the nut insertion hole 46 is smaller than the outside diameter of the elastic ring member 39 described above.

In the embodiment, the case 45 of the sensor unit 40 is laterally long and flat in shape, and the cylindrical part 45T is provided in one longitudinal end of the case 45. Therefore, the nut insertion hole 46 is located on one longitudinal end side of the sensor unit 40. The case 45 houses the pressure sensor 41, the temperature sensor 42, the transmitter 43, and the battery 44 in a portion located on the other longitudinal end side from the cylindrical part 45T.

The respective configurations of the components constituting the tire state monitoring device 10 are all described above. It should be noted that, in the present embodiment, the first male screw part 21 formed on the mount shaft part 14 of the valve stem 13 corresponds to "a male screw part" described in claim 1. Next, a description of mounting of the tire state monitoring device 10 to the tire wheel 91 will be given.

To mount the tire state monitoring device 10 on the tire wheel 91, firstly, the cylindrical nut 30 is inserted into the nut insertion hole 46 of the sensor unit 40. By inserting the cylindrical nut 30 into the nut insertion hole 46, the sensor unit 40 is held by the cylindrical nut 30 by virtue of the resilient force of the elastic ring members 39.

When the cylindrical nut 30 is inserted into the nut insertion hole 46, the tire valve 11 is then attached to the tire wheel 91. Specifically, while the mount shaft part 14 of the valve stem 13 is kept inserted into the mounting hole 91A from inside the wheel rim 91R (i.e., the center side of the wheel rim 91R), the hexagonal nut 25 is screwed onto the second male screw part 22 of the mount shaft part 14 from outside the wheel rim 91R (i.e., the side away from the center of the wheel rim 91R). Consequently, the wheel rim 91R is sandwiched between the flange part 14F of the mount shaft part 14 and the hexagonal nut 25, and the tire valve 11 is attached to the tire wheel 91. At this time, the annular sealing member 23 held in the annular groove 23M of the flange part 14 is pressed against the open edge of the mounting hole 91A, so that the space between the tire valve 11 and the tire wheel 91 (specifically, between the mount shaft part 14 and the wheel rim 91R) is sealed. It should be noted that in a state where the tire valve 11 is attached to the tire wheel 91, the connection shaft part 15 (refer to FIG. 2) of the valve stem 13 is arranged in the axial direction of the tire wheel 91.

When the tire valve 11 is attached to the tire wheel 91, the cylindrical nut 30 is then screwed onto the first male screw part 21 of the mount shaft part 14 from outside the wheel rim 91R. By screwing the cylindrical nut 30 onto the first male screw part 21, the sensor unit 40 is fixed to the tire valve 11 via the cylindrical nut 30 and elastic ring members 39. Thus, the tire state monitoring device 10 can be mounted on the tire wheel 91. Here, since, in the present embodiment, the length of the nut insertion hole 46 is less than the length of the portion, located on the leading-end side from the flange part 30F, of the cylindrical nut 30, the sensor unit 40 is prevented from being sandwiched by the flange part 30F. The sensor unit 40 projects from the cylindrical nut 30 in a cantilever fashion and is arranged in a circumferential direction of the tire wheel 91.

Next, the advantageous effects of the operation of the tire state monitoring device 10 in the present embodiment will be described. In the tire state monitoring device 10 in the present embodiment, by inserting the cylindrical nut 30 into the nut insertion hole 46 of the sensor unit 40, the sensor unit 40 is held by the cylindrical nut 30 by virtue of the resilient force of the elastic ring members 39 fitted on the outer peripheral surface of the cylindrical nut 30. Then, in this state, the cylindrical nut 30 is screwed onto the first male screw part 21 of the valve stem 13 (mount shaft part 14) of the tire valve 11 fixed to the tire wheel 91. Thereby, the sensor unit 40 is fixed to the tire valve 11 via the cylindrical nut 30 and elastic ring members 39.

Incidentally, for example, if the tire 92 hits the sensor unit 40 when the tire 92 is mounted on the tire wheel 91 to which the tire state monitoring device 10 has been attached, external force that rotates the sensor unit 40 around the axis of the cylindrical nut 30 may act on the sensor unit 40. If such external force acts on the sensor unit 40, frictional force occurs between the sensor unit 40 and the elastic ring members 39. If the magnitude of the external force is equal to or smaller than that of the frictional force, the sensor unit 40 is fixed to the cylindrical nut 30. If the magnitude of the external force is larger than that of the frictional force, the sensor unit 40 rotates around the cylindrical nut 30. In this case, since the sensor unit 40 is fixed to the cylindrical nut 30 via the elastic ring members 39 in configuration, dynamic force of the sensor unit 40 is not transmitted to the cylindrical nut 30 even if the sensor unit 40 rotates, thus preventing the cylindrical nut 30 from being rotated together with the sensor unit 40. By virtue of this, loosening of the cylindrical nut 30 is hindered and the fixing of the sensor unit 40 to the tire valve 11 is stabilized.

The magnitude of frictional force caused between the sensor unit 40 and the cylindrical nut 30 is adjusted by altering the material or sectional diameter of the elastic ring members 39. In the present embodiment, since the plurality of annular grooves 38, in which the elastic ring members 39 are respectively fitted, are provided in the cylindrical nut 30, the magnitude of the frictional force can be adjusted also by altering the number of elastic ring members 39 fitted in the cylindrical nut 30.

In addition, in the present embodiment, the flange part 30F prevents the sensor unit 40 from separating from the cylindrical nut 30. Moreover, a portion of the cylindrical nut 30, which portion is located on the tire wheel 91 side from the flange part 30F, is longer than the nut insertion hole 46. Therefore, when the cylindrical nut 30 is screwed onto the first male screw part 21, the flange part 30F is prevented from sandwiching the sensor unit 40. Thus, dynamic force resulting from rotation of the sensor unit 40 is securely prevented from being transmitted to the cylindrical nut 30.

(Deleted)

OTHER EMBODIMENTS (1) In the foregoing embodiment, the number of the annular grooves 38 formed in the cylindrical nut 30 is more than one, but it may be only one. In this case, by altering the quality or sectional diameter of the elastic ring members 39, the magnitude of frictional force caused between the sensor unit 40 and the elastic ring members 39 can also be adjusted.

(2) In the foregoing embodiment, the cylindrical nut 30 need not have the flange part 30F in configuration.

Figure 6:
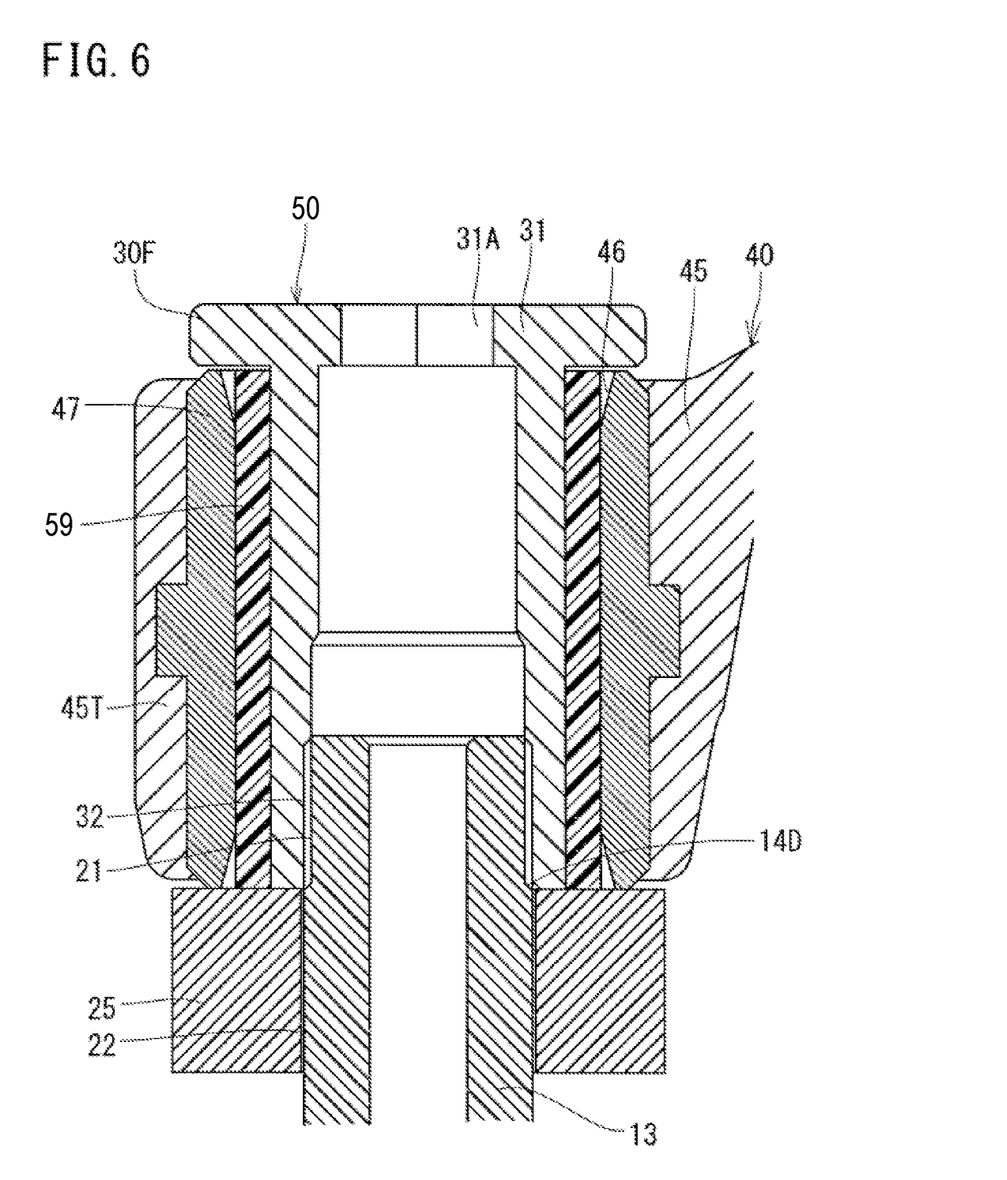
FIG. 6 is a sectional side view of a periphery of a cylindrical nut of a tire state monitoring device according to a modification.

(3) In the foregoing embodiment, each of the elastic ring members 39 includes an O-ring but may include a square ring having a quadrangular cross-section. As shown in FIG. 6, the elastic ring member 59 may include a collar made of resin (for example, made of silicone). In this case, as shown in the same drawing, the cylindrical nut 50 need not have the annular groove 38 in configuration.

(4) In the foregoing embodiment, the nut insertion hole 46 is disposed in the one longitudinal end of the sensor unit 40 in configuration but it may be disposed in the longitudinal middle of the sensor unit 40. In this case, while the sensor unit 40 is kept fixed to the tire valve 11, the sensor unit 40 projects in two opposite directions from the cylindrical nut 30, 50.

In the tire state monitoring device 10 in the foregoing embodiment, a configuration in which, instead of providing the elastic ring members 39, 59, elastic members that elastically deform in a radial direction of the cylindrical nut 30, 50 are provided in a plurality of circumferential parts of the cylindrical nut 30, 50 can exhibit the same advantageous effects as the foregoing embodiment.

DESCRIPTION OF THE REFERENCE NUMERAL

10 Tire state monitoring device
11 Tire valve
13 Valve stem
21 First male screw part (male screw part)
30 Cylindrical nut
39 Elastic ring member
40 Sensor unit
46 Nut insertion hole
91 Tire wheel
92 Tire

The invention claimed is:

1. A tire state monitoring device formed integrally with a tire valve mounted on a tire wheel, the tire state monitoring device comprising:
　　a valve stem provided in the tire valve and penetrating through the tire wheel;
　　a male screw part formed on an outer peripheral surface of a portion of the valve stem that is located in a tire;
　　a cylindrical nut screwed onto the male screw part of the valve stem;
　　a sensor unit configured to detect a tire state and configured to transmit a detection result to an external part;
　　a nut insertion hole formed in the sensor unit and in which the cylindrical nut is inserted; and
　　an elastic ring member fitted on an outer peripheral surface of the cylindrical nut and configured to elastically deform in a radial direction of the cylindrical nut while the cylindrical nut is kept inserted in the nut insertion hole,
　　wherein the sensor unit is held by the cylindrical nut by a resilient force of the elastic ring member.

2. The tire state monitoring device according to claim 1, wherein the outer peripheral surface of the cylindrical nut includes a plurality of annular grooves in which the elastic ring member is fitted.

3. The tire state monitoring device according to claim 2, wherein:
　　the cylindrical nut includes a flange part facing an on open edge of the nut insertion hole of the sensor unit from a side opposite to the tire wheel, and
　　a portion of the cylindrical nut from the flange part to a tire wheel side is longer than the nut insertion hole.

4. The tire state monitoring device according to claim 1, wherein:
　　the cylindrical nut includes a flange part facing an open edge of the nut insertion hole of the sensor unit from a side opposite to the tire wheel, and
　　a portion of the cylindrical nut from the flange part to a tire wheel side is longer than the nut insertion hole.

* * * * *